US009235365B2

(12) United States Patent
Horst

(10) Patent No.: US 9,235,365 B2
(45) Date of Patent: Jan. 12, 2016

(54) METHOD FOR TRANSMITTING AN ENABLE SIGNAL TO A CLIENT DEVICE WHEN A PRINTING DEVICE IS AVAILABLE TO EXECUTE AN ORDER

(75) Inventor: Matthias Horst, Bochum (DE)

(73) Assignee: EHT Vermogensverwaltung UG, Bochum (DE)

( * ) Notice: Subject to any disclaimer, the term of this patent is extended or adjusted under 35 U.S.C. 154(b) by 24 days.

(21) Appl. No.: 14/237,781

(22) PCT Filed: Jul. 3, 2012

(86) PCT No.: PCT/EP2012/062911
§ 371 (c)(1),
(2), (4) Date: May 5, 2014

(87) PCT Pub. No.: WO2013/020756
PCT Pub. Date: Feb. 14, 2013

(65) Prior Publication Data
US 2014/0253967 A1 Sep. 11, 2014

(30) Foreign Application Priority Data
Aug. 9, 2011 (DE) .......................... 10 2011 109 748

(51) Int. Cl.
G06F 3/12 (2006.01)
H04L 29/08 (2006.01)
(52) U.S. Cl.
CPC .............. *G06F 3/1286* (2013.01); *G06F 3/122* (2013.01); *G06F 3/126* (2013.01); *G06F 3/1222* (2013.01); *G06F 3/1236* (2013.01); *G06F 3/1259* (2013.01); *G06F 3/1267* (2013.01); *G06F 3/1285* (2013.01); *H04L 67/025* (2013.01); *H04L 67/325* (2013.01)
(58) Field of Classification Search
USPC .......... 358/1.15, 1.6, 402, 403, 407; 709/202, 709/203, 227, 206, 223, 217, 224, 225, 226, 709/238; 710/1, 5, 8, 15, 17, 18, 19, 20, 36, 710/37, 38, 39, 40, 72, 240; 700/9; 705/51, 705/52
See application file for complete search history.

(56) References Cited

U.S. PATENT DOCUMENTS 6,115,132 A * 9/2000 Nakatsuma et al. ......... 358/1.14
6,256,750 B1 7/2001 Takeda
(Continued)

FOREIGN PATENT DOCUMENTS

| EP | 0999494 | 5/2000 |
|----|---------|--------|
| EP | 1936490 | 6/2008 |
| WO | 0233531 | 4/2002 |

*Primary Examiner* — Barbara Reinier
*Assistant Examiner* — Jonathan R Beckley
(74) *Attorney, Agent, or Firm* — Honigman Miller Schwartz and Cohn LLP

(57) ABSTRACT

The invention relates to a method for operating a network system (2) having at least one client device (4.1, 4.2), at least one management device (16) and at least one printing device (14), comprising: provision of a first order from the client device (4.1, 4.2) for execution by the at least one printing device (14), storage of the order in a memory device (10.1, 10.2) of the client device (4.1, 4.2), transmission of an order request from the client device (4.1, 4.2) to the management device (16), wherein the order of execution of orders is managed by the management device (16), transmission of requests from the client device (4.1, 4.2) to the management device (16) at first prescribable intervals of time to determine whether the printing device (14) is available for executing the order from the client device (4.1, 4.2), and transmission of an enable signal from the management device (16) to the client device (4.1, 4.2) in response to the request from the client device (4.1, 4.2) when the printing device (14) is available for executing the order from the client device (4.1, 4.2).

20 Claims, 2 Drawing Sheets

(56) References Cited

U.S. PATENT DOCUMENTS

| | | | | |
|---|---|---|---|---|
| 6,748,471 B1* | 6/2004 | Keeney | | G06F 3/1204 358/1.15 |
| 7,177,043 B2* | 2/2007 | Qiao | | H04L 63/02 358/1.13 |
| 7,190,477 B2* | 3/2007 | Ferlitsch | | G06F 3/1203 358/1.15 |
| 7,359,076 B2* | 4/2008 | Uchino | | G06F 21/608 358/1.15 |
| 7,574,545 B2 | 8/2009 | Keeney et al. | | |
| 7,574,546 B2* | 8/2009 | Keeney | | G06F 3/1204 358/1.15 |
| 8,054,485 B2* | 11/2011 | Berglin | | G06F 3/1205 358/1.14 |
| 2002/0105671 A1 | 8/2002 | Sugahara | | |

\* cited by examiner

METHOD FOR TRANSMITTING AN ENABLE SIGNAL TO A CLIENT DEVICE WHEN A PRINTING DEVICE IS AVAILABLE TO EXECUTE AN ORDER

CROSS-REFERENCE TO RELATED APPLICATIONS

This application claims priority from PCT application PCT/EP2012/062911, filed on Jul. 3, 2012, which claims priority from German application 102011109748.5, filed on Aug. 9, 2011, the entire contents of which are incorporated by reference.

TECHNICAL FIELD

The invention relates to a method for operating a network system with at least one client device, at least one management device and at least one printing device. The invention also relates to a network system, a computer program and a computer program product.

In many companies, but also in the private sector, network systems are increasingly used for connecting different electric devices with one another. A network system may, for example, comprise one or more servers, one or more printing devices and one or mom client devices which, can communicate with each other via a wireless and/or a wired network. With printing devices of a network system these may, in particular, be printing devices shared by the client devices. It is understood that hi the network system there may exist one or more multi-function devices for performing different functions such as printing, scanning, copying, faxing, all combined in one device.

BACKGROUND

In order for a printing device to be able to be shared by a plurality of client devices a server device, such as a print server, is normally provided. A print order generated by a client device would be initially transmitted to the print server. The print server stores the print order, i.e. the printing data. In general a queue is provided in the print server in order to manage the execution of the print orders in a specifiable order. When the printing device is available for the print order from the client device, the print server transmits the respective print order for printing to the printing device.

Corresponding network systems and methods for operating the network systems are known from the prior art. However, they suffer from the disadvantage of increased requirements for resources and maintenance. Not only is there a need for an additional server device with corresponding computing and storage performance, but the additional server device also requires maintenance which means additional costs.

A solution to the problem is offered in the U.S. Pat. No. 6,115,132 A which offers a method for operating a network system with a plurality of client devices, at least one printing device in the form of a printer and a print server. The print server, in particular, is used for managing the sequence of the print orders, wherein the print orders as such remain on the client device. After the client device has transmitted printing information, but not the actual printing data, to the print server, this then controls the sequence of the print orders to be executed by the printing device. To this end the print server actively transmits an enable signal to the client device when the printer is ready for printing the respective order. Upon receipt of the enable signal the client device transmits the printing data to the printer. Finally the printer informs the print server that the order has been completed.

However, this method has the disadvantage that the print server must transmit a message to the client device. In view of today's increasing safety requirements this is frequently problematic. The reason for this is that these days the client device or an intermediate device, as a rule, comprises a protection device such as a firewall. The firewall, however, restricts access to the client device from external devices. This means, of course, that the firewall also blocks the enable message actively sent by the print server.

According to the prior art this problem is known to be solved by explicitly disconnecting the protective application for all external devices such as a plurality of print servers, in order to allow the enable signal to be transmitted to the client device. Configuring a protective application in this way, is expensive however, in particular given she plurality of network devices to be disconnected which can quickly overburden a user. On the other hand, if a disconnecting error occurs, this may lead to unauthorised third parties gaining access to the client device.

It is therefore the object of the invention to provide a method for operating a network system which, in a simple way, permits reduction of the requirement for resources and the amount of maintenance involved whilst at the same time ensuring a low security risk.

According to the invention, this object is solved by a method for operating a network system according to claim 1. In particular the requirement according to the invention is solved by a method for operating a network system with at least one client device, at least one management device and at least one printing device. The method comprises the following steps:

provides a first order from the client device for execution by the at least one printing device, storing the order in a memory device of the client device, transmitting an order request from the client device to the management device, wherein the sequence of execution of orders is managed by the management device, transmitting requests from the client device to the management device at first prescribable intervals of time to determine whether the printing device is available for executing the order from the client device, and transmitting an enable signal from the client device in response to the request from the client device when the printing device is available for executing the order from the client device.

SUMMARY

In contrast to the prior art, according to the invention a blockage of an enable signal from a management device to a client device is prevented in a simple way including when a protective application is present, in that a communication is (always) initiated by the client device. In other words the management device behaves (always) passively, whilst the client device can actively initiate a communication with the management device.

The at least one client device may, for example, be a computer, a tablet PC, a smartphone a personal digital assistant (PDA), a notebook etc. The management device may be a management device with processor means, storage means, interfaces etc., such as a computer. In particular the management device comprises a server component for managing the sequence of orders to be executed. For example, it is possible for the management device to be formed by a (special) client computer or the printing device. In contrast to a print server device however, the performance requirements and the maintenance required for a management device are significantly reduced. The printing device may be understood here to be a resource which provides a function or a service to the client device. In other words, a printing device may preferably be shared by a plurality of client devices.

An order, such as in particular a print order, can be provided by the at least one client device for execution on the at least one printing device. For example, a print order may be generated by an application of the client device.

The order and the order data, respectively, can be locally stored in the client device. For example, the client device may comprise and order component comprising a client and a server component. The order component may be provided, in particular, in order to monitor storage and execution of the order. The client device transmits an order request to the management device preferably via a network.

An order request comprises order information data. Preferably an order request only comprises data which is necessary for managing the sequence of execution of orders. For example, at least the type of order and/or the selected printing device may be transmitted. Data for executing the order such as e.g. the printing data for executing a print order, is not transmitted. Locally storing the order or the order data brings with it the advantage that there is no longer nay need for a server device with a major resource requirement to be provided.

Furthermore the client device transmits requests to the management device. In particular the client device can send a query as to whether the printing device is available for executing its order, i.e. whether the client device or the order of the client device is next in line. Preferably the client device can poll the management device at prescribable intervals of time.

When the management device at least detects that the printing device is available for executing the order of the client device, i.e. when it is the turn of the client device, the management device may transmit an enable signal in form of a response to the client device. In other words the management device does not actively transmit an enable signal, but transmits a signal only following a request from the client device. The enable signal is therefore not blocked by a protective application of the client device or an intermediate device.

It is understood that the first time intervals may be selected such that almost no unnecessary idling times occur, i.e. time in which no order is executed although order requests are present. It is understood that after a first request the printing device may already be available.

In a simple way according to the invention the requirement for resources and maintenance can be reduced without diminishing security in particular of a client device.

In principle management of the sequence of print orders to be executed can be managed in any given manner. It had been found that the sequence of orders can be managed in a particularly simple way and, at the same time, without prioritizing certain orders if a ticketing system is used. Preferably according to a first embodiment of the method according to the invention a rank number may be assigned by the management device to the received order request. The sequence of execution of the orders may depend on the rank numbers of the order requests. In particular a chronological rank number may be allotted in the order in which each order request is received. In particular, the FIFO principle (first in first out) may be implemented. For example the rank numbers may be allotted in increasing order. In this case the print order with the lowest rank number is the print order to be currently executed, i.e. the active order.

Moreover, after receipt of the order request at least the rank number assigned to the order request can be transmitted in response, from the management device to the client device. In addition information on the approximate point in time, at which the printing device is available for executing the order, can preferably be transmitted. Furthermore the rank number assigned to the currently executed order request can preferably be transmitted in addition. It is understood that instead of this rank number the number of orders still to be processed can be transmitted to the client device. Especially preferably at least one first time interval may be transmitted.

In other words the client device can receive information from the management device, at what time its order will (probably) be executed by the printing device. For example, this information can be notified to the user. In addition the information may be utilised for determining the first time interval and for sending a request to the management device. Preferably, however, a first time interval may be prescribed by the management device.

According to a further embodiment provision may be made for the management device to transmit a response to each request from the client device. In particular, current information about the (approximate) point in time, at which the printing device is available for executing the order, can be transmitted by means of the response. For example, the currently active rank number may be transmitted. In addition or alternatively a new first time interval may be prescribed in response to each request. The first time interval may be variable and may be adapted to reflect the current status of the printing device and/or the management device and/or the client device. It is understood that alternatively a constant time interval may also be provided.

A further advantage consists in that the above-mentioned information cannot be blocked by a protective application. The reason for this is again that this information can be transmitted (only) in the form of a response to a request from the client device. The management device in particular is passive.

According to a further embodiment of the method according to the invention, after receipt of the enable signal the stored order from the client device can be transmitted to the printing device for executing the order. Preferably immediately following receipt of the enable signal, the order such as a print order can be transmitted to the printing device. Even without a separate print server, print orders can be executed promptly.

Following transmission of an order from the client device to the printing device, according to a further embodiment of the method according to the invention provision may be made for the client device to monitor the execution of the order. Preferably status requests may be transmitted at second prescribable time intervals from the printing device to the printing device. The second time intervals may be preferably constant and be based, for example, an previously performed tests. Following receipt of a request the printing device can send the status of the order to be executed to the client device in the form of a response. For example, for a print order the number of pages still to be printed, the number of pages already printed, error messages etc. may be transmitted.

An Interruption of the execution of the order, for example due to a technical defect of the printing device, may be detected promptly.

A status of the order to be executed is, in particular, the (successful) completion of the order by the printing device. Preferably after completion of the order from the client device a first completion signal may be transmitted to the client device in response to a request from the client device. The client device may be informed promptly of the completion of the order.

According to a further embodiment the client device can transmit status messages on the status of the order to be executed to the management device at prescribable time intervals. The prescribable time intervals may have been previously agreed between the management device and the client device. In particular this makes it possible for the management device to detect a failure of a client device, for example due to a technical defect etc.

Preferably the status message may be sent from the printing device to the management device upon each receipt of a status response. The management device is (always) kept informed of the progress of the order. The status information may be utilised by the management device for immediately and regularly determining first time intervals for waiting order requests. Also, in case of an error message or a technical fault in the printing device, the management device may be advantageously configured to inform the client devices, which have transmitted order requests to the management device, on the fault, in particular in form of a response to a request. For example, following a message regarding a fault, a client device may cancel the order request. Another printing device for processing the order may be selected by the client device. The order request can be removed from the queue by the management device. In a simple manner a high execution speed of the orders can be guaranteed even in case of faults.

Furthermore, in particular following receipt of a first completion signal from the client device, a second completion signal may be transmitted from the client device to the management device. The management device may be informed promptly of the completion of the order. After receipt of the second completion signal the respective order request may be removed from the queue by the management device. The next order can be executed. Preferably the next print order is the order request which has been assigned the next rank number.

According to a further embodiment of the method according to the invention an order expense for executing the order from the client device can be determined by the printing device. The determined order expense may be transmitted from the printing device to the client device for settlement. In addition provision may be made for the order expense to be transmitted from the client device to an accounting server. It may be desirable to charge the cost for processing an order to the customer, e.g. to the user of the client device. To this end expense parameters of the order and the customer may be determined.

An order expense of a print order may, for example, be the number of printed pages, the print type, the print medium, etc. The amount due may e.g. be a certain amount per page. The printing device may at least be configured for determining one expense parameter. This may be transmitted to the client device and/or an accounting server. Preferably the determined expense data may be transmitted as part of a status response from the printing device to the client device.

In addition to determining the order expense it may also be necessary to determine the customer. For example, the customer may be determined from the transmission protocol used such as the Internet Printing Protocol (IPP) or the Line Printer Remote protocol (LPR). It is also possible to use other sources such as a digital signature card or the like. Charging a customer for orders executed by a shared printing device is therefore quite easy.

A further aspect of the Invention is a network system with at least one client device, at least one management device and at least one printing device, wherein the client device is configured for providing a first order for execution by the at least one printing device, wherein the client device comprises a storage device configured for storing the order, the client device is configured for transmitting an order request to the management device, wherein the management device is configured for managing the sequence of execution of the orders. The client device is configured for transmitting requests in prescribable time intervals to the management device, querying as to whether the printing device is available for executing the order from the client device. The management device is configured for sending an enable signal in response to a request from the client device, once the printing device is available for executing the order from the client device.

The network system is suitable, in particular, for executing the above-described method.

A further aspect of the present invention is a computer program with instructions executable on a processor such that a network system is operated by means of the above-described method.

A still further aspect of the present invention is a computer program product comprising an above-described computer program with instructions executable on a processor such that a network system is operated by means of the above-described method.

The features of the method and of the network system can be freely combined with one another. In particular features of the description and/or the dependent claims may be independently inventive in their own right or may be freely combined with one another, including fully or partially by-passing features of the independent claims. Furthermore features of the description and/or the dependent claims may be formed by software components and/or hardware components.

A variety of possibilities exists to arrange and further develop the method according to the invention for operating a network system, the network system according to the invention, the computer program according to the invention and the computer program product according to the invention. To this end reference should be made, on the one hand, to the patent claims subordinate to the independent patent claims, and on the other, to the description of exemplary embodiments in conjunction with the drawing. In the drawing

DETAILED DESCRIPTION

Figure 1:
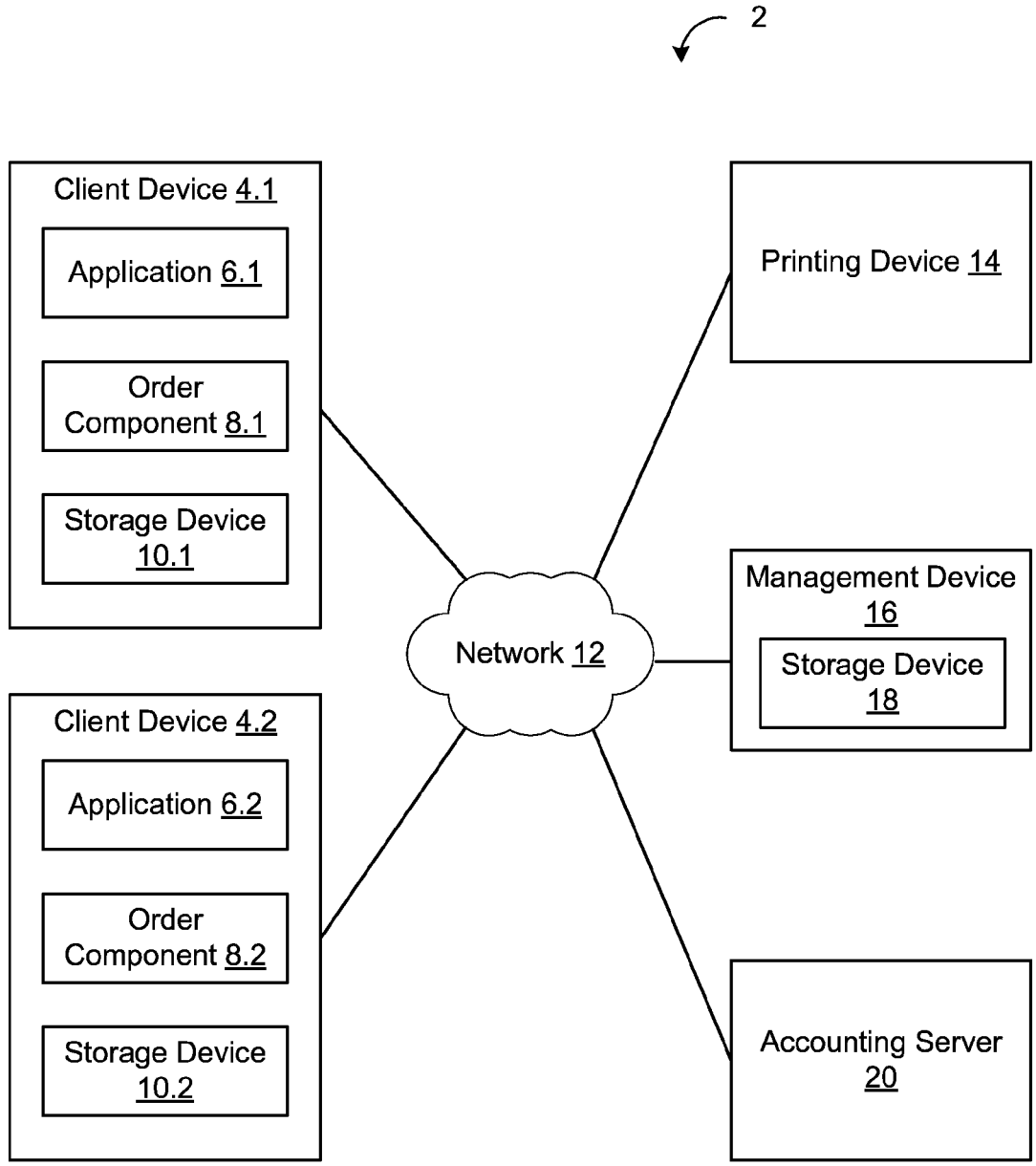
FIG. 1 shows a schematic view of an exemplary embodiment according to the invention.

FIG. 1 shows a schematic view of an exemplary embodiment of a network system 2 according to the present invention.

The network system 2 depicted comprises a first client device 4.1 and a second client device 4.2. It is understood that a plurality of client devices or one client device only can be provided.

The client devices 4.1, 4.2 may be personal computers, tablet PCs, smartphones, notebooks etc. Preferably a client device 4.1 4.2 comprises processing means such as a processor, storage means, interfaces and the like. In principle different client devices 4.1, 4.2 may be provided.

In particular a client device 4.1, 4.2 may comprise an application 6.1, 6.2. The application 6.1, 6.2 may be configured, in particular, for creating an order such as a print order. For example, the application 6.1, 6.2 may be a word application.

Moreover, a client device 4.1, 4.2 in this case comprises an order component 8.1, 8.2 such as a printing component 8.1, 8.2 for managing print orders on the client device 4.1, 4.2. The printing component 8.1, 8.2 may have a double function and may be composed, in particular, of a client and a server component.

Further, a client device 4.1, 4.2 has at least one storage device 10.1, 10.2 such as a hard disc or the like. The storage device 10.1, 10.2 is configured, in particular, for storing orders such as prepared print orders. In other words, the print orders may be stored locally, prior to printing, on a storage device 10.1, 10.2 assigned to the client device 4.1, 4.2.

It is understood that according to other variants of the invention a client device 4.1, 4.2 may be connected also with an alternative or additional storage device such as an external hard disc, USB stick etc. for locally storing the print orders.

As has already been described, a client device 4.1, 4.2 has interfaces. In particular a suitable interface may be provided for linking the client device 4.1, 4.2 with a network 12. The network 12 may be a local or a non-local network 12. In addition the network may be a wireless or a wired network 12. Exemplary networks 12 are a local area network (LAN) a wireless LAN (WLAN), a wide area network (WAN), etc. It is understood that different sub-networks may be combined to form one network 12.

Further the FIG. 1 shows that the network system 2 comprises at least one printing device 14. For example, a network printer 14 may be provided. It is understood that a network system 2 may comprise a plurality of (different) printing devices.

A network printer 14 may comprise an indicating device for example in the form of a display and a processor, storage means, interfaces etc. In particular the printing device 14 may be connected with the network 12. The printing device 14 may be a secured printing device 14 which requires authorization of a user at the printing device 14 for printing a document or the like.

In addition a management device 16 is provided. The management device 16 may comprise a processor, storage means, interfaces etc. The management device 16 may comprise a server component and be configured, in particular, for managing the print order on at least one printing device 14. The management device 16 may offer a storage device 18 for storing order requests of print orders, and a queue.

The storage device 18 may be operated according to the FIFO principle. But other ways of managing the sequence of print orders are also feasible. For example, order requests may comprise different priorities, wherein order requests with a higher priority can take precedence over order requests with a lower priority.

In particular, the management device 16 may be configured to assign a rank number to each order request received. For example a suitable number generator may be provided.

In the present exemplary embodiment finally the network system 2 comprises an accounting server 20. The accounting server 20 may be configured to settle the expense of executing an order. With a print order of a user, for example, settlement of the print order may be effected depending on the number of pages printed, the type of print, the type of print medium etc. For example, the accounting server 20 may be used for managing user accounts and for storing respective details.

Figure 2:
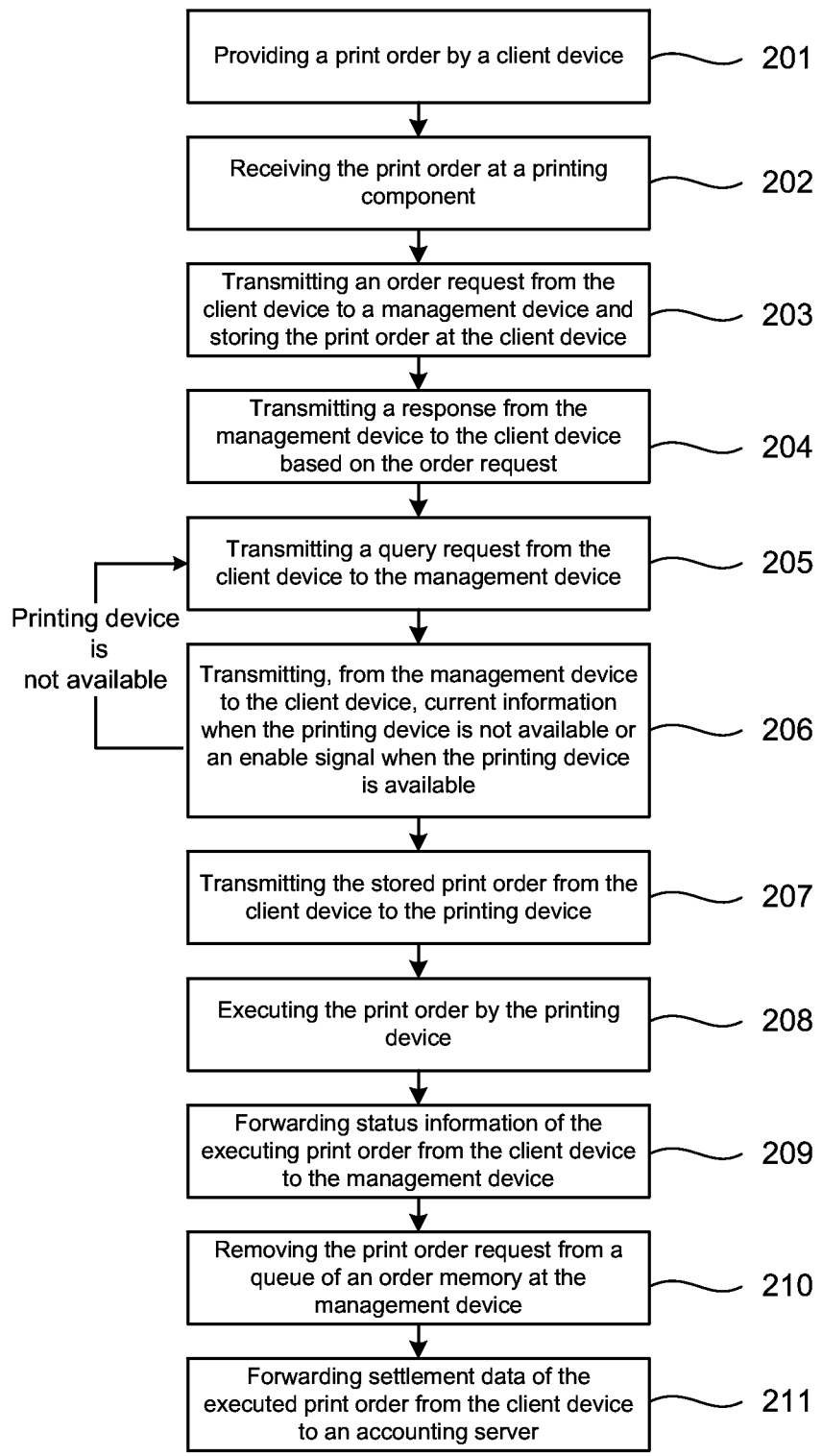
FIG. 2 shows a flow diagram of a method for operating a network system according to the present invention.

FIG. 2 shows a flow diagram of an exemplary embodiment of a method for operating a network system 2 such as shown by way of example in FIG. 1. The method for operating a network system 2 will now be explained in detail using print orders as an example.

In a first step 201 an order, in particular a print order, may be provided by a client device 4.1, 4.2. Preferably a print order may be generated by the client device 4.1, 4.2, for example by means of an application 6.1, 6.2.

The print order provided may be received by the printing component 8.1, 8.2 in step 202. In particular the printing component 8.1, 8.2 may receive a print order at an LPR port or alternatively at an IPP port.

In a next step 203 the printing component 8.1, 8.2 can cause an order request, in particular a print order request, to be transmitted from the client device 4.1, 4.2 via the network 12 to the management device 16. The order request can comprise at least one detail on the type of order and/or the printing device 14 which is to execute the order. Further, the user name, the number of pages to be printed etc. may be transmitted. The transmission and communication can be based on suitable protocols such as the Internet Printing Protocol (IPP) or the Line Printer Remote Protocol (LPR).

Preferably, in parallel with the transmission of the order request to the management device 16, the order request, i.e. the data to be printed, can be stored in a (local) storage device 10.1, 10.2 which is assigned to the client device 4.1, 4.2. A conventional print server may be omitted. It is understood that the two above-mentioned steps can also be executed in series.

After receipt of the order request from the client device 4.1, 4.2 the management device 16 can assign a rank number to the order request (step 204). In particular a number generator can be provided which assigns a rank number to each received print order in a chronological sequence. The order request may be stored together with the assigned rank number in an order memory 18. It is understood that further data such as the number of pages to be printed, the print type, the selected printing device 14 etc. can be stored. For example, the order memory 18 may be realised in form of a queue. Due to the small amount of data of an order request compared to that of a print order the requirements regarding resources and maintenance for a management device 16 are small.

In step 204 the management device 16 can also transmit a response to the client device 4.1, 4.2 regarding the order request therefrom. In particular, the rank number assigned to the order request can be transmitted. Additionally information regarding the (approximate) point in time at which the printing device 14 is available for executing the order, can preferably be transmitted. Furthermore the rank number of the order request currently being executed on the printing device 14 can preferably be transmitted. This enables the client device 4.1, 4.2 to derive from the difference between the rank numbers the time, at which the print order from the client device 4.1, 4.2 will be executed. It is also possible to transmit the difference, i.e. the number of order requests from the client device 4.1, 4.2 currently in the queue, instead of the currently executed rank number.

For example, the rank number of the order request from the client device 4.1, 4.2 may be fifteen and the currently executed order request may be eleven. This enables the client device 4.1, 4.2 to conclude that prior to the execution of its own print order three more print orders have to be executed.

It is understood that rank numbers can be assigned and generated randomly. In principle characters or other signs can be issued as long as a sequence of execution can be managed and order requests can be placed into a queue in a suitable manner.

It is especially preferred if the management device 16 (additionally) transmits a first time interval to the client device 4.1, 4.2. The first time interval indicates (until) when the client device 4.1, 4.2 shall transmit a next request to the management device 16 (step 205). Provision may be made for the order request from the client device 4.1, 4.2 to be deleted if the same does not transmit a request to the management device 16 within a prescribed time interval. In this way it is possible to avoid a pile-up due to an inactive client device 4.1, 4.2. On the other hand the client device 4.1, 4.2 is (always) allowed this first time interval for transmitting a request, even if the printing device 14 is already available for executing the print order. In particular, however, the first time interval may be chosen such that a delay of this kind is practically not possible. The first time delay may depend, in particular, on the number of order requests and/or the type of order requests.

By transmitting the above-mentioned information in response to the order request from the client device 4.1, 4.2, a protective application such as a firewall cannot block this transmission.

In a next step 205, as already described following a first prescribable time interval a request may be transmitted to the management device 16. In particular the client device 4.1, 4.2 can query as to whether the printing device 14 is available for processing the print order from the client device 4.1, 4.2.

In a next step 206 the management device 16 can transmit a response to the client device 4.1, 4.2 in reaction to the request from the client device 4.1, 4.2. In particular, the management device 16 may transmit a response in reaction to each request from the client device 4.1, 4.2. For example, the response may comprise current information on the (approximate) point in time, at which the printing device is available for executing the order. The currently active rank number may also be transmitted. Additionally or alternatively a new first time interval may be specified in reaction to each request. The first time interval may be variable and be adapted to suit current states of the printing device 14 and/or the management device 16. It is understood that alternatively a constant time interval may be provided. The determining of the first time interval may be omitted.

Steps 205 and 206 may be performed repeatedly. In other words, the client device 4.1, 4.2 can poll the management device 16 at prescribable time intervals. As has already been described, due to actively sending requests and transmitting information in response to these requests it is prevented that corresponding information is blocked for example by a firewall of the client device 4.1, 4.2.

If the printing device 14 is available for executing the print order, i.e. if the print order from the client device 4.1, 4.2 is to be executed next, the management device 16 in step 206 transmits an enable signal as a response to the client device 4.1, 4.2.

In a next step 207 the client device 4.1, 4.2 transmits the stored print order (directly) to the printing device 14, in particular by means of the printing component 8.1, 8.2.

Following receipt of the print order from the client device 4.1, 4.2 this is executed in step 208 by the printing device 14. During execution of the print order by the printing device 14 the execution can be monitored by the client device 4.1, 4.2. In particular the client device 4.1, 4.2 can poll the printing device 14. Status requests can be transmitted to the printing device 14 at prescribable second time intervals. In response the printing device 14 can transmit information on the status of the execution of the print order to the client device 4.1, 4.2. For example, the information transmitted can include information on the progress of printing, a technical fault etc. In this case also, the transmitted information is not blocked as a result of the transmission in response to a request.

Furthermore the client device 4.1, 4.2 can forward the received status information to the management device (step 209). The client device 4.1, 4.2 and the management device 16 may have agreed on time intervals for transmission of the status information. Depending on this information the prescribable first intervals may be determined for waiting print orders or client devices 4.1, 4.2, for example. Furthermore if no request arrives, the conclusion may be drawn, at an agreed point in time that a technical defect occurred in the client device 4.1, 4.2; that the client device 4.1, 4.2 was switched off etc. This allows appropriate measures to be taken.

If in response to a request the client device 4.1, 4.2 receives a first ending signal from the printing device 14, it can report this to the management device 16. For example, a second ending signal can be sent by the client device 4.1, 4.2 to the management device 16. The two ending signals may be identical. In other words, the client device 4.1, 4.2 can forward the second ending signal to the management device 16.

Following receipt of the second ending signal the management device 16 removes the corresponding order request from the queue of the order memory (step 210). The waiting print orders move up and the client device 4.1, 4.2 whose print order has the next rank number is informed accordingly by means of a response to a request from this client device 4.1, 4.2.

It is understood that a management device 16 can manage a plurality of printing devices. For example, a separate queue may be provided for each printing device.

In addition to the first ending signal the printing device 14 can transmit settlement data of the executed print order to the client device 4.1, 4.2. The settlement data may comprise the (actually) printed pages, the print type (e.g. colour or black-and-white), the paper type etc. In particular the printing device 14 may be equipped with a counter. The counter count prior to printing can be compared with the counter count after the print order has been printed. The difference can be transmitted to the client device 4.1, 4.2. For example the settlement data can be transmitted together with the first ending signal.

The settlement data can be initially transmitted locally in the client device 4.1, 4.2. In particular this may be provided if the accounting server 20 is currently not reachable. Transmission of this data to the accounting server 20 may then be effected later. It is understood that the settlement data may be forwarded to the accounting server 20 for settlement also without having been stored locally in a buffer in the client device 4.1, 4.2 (step 211).

The invention claimed is:

1. A method for operating a network system with at least one client device, at least one management device and at least one printing device, comprising:
   providing a first order from the at least one client device for execution by the at least one printing device,
   storing the first order in a storage device of the at least one client device,
   transmitting an order request from the at least one client device to the at least one management device, the order request only comprising data necessary for managing a sequence of a plurality of received orders by the at least one printing device, wherein the sequence of the plurality of received orders is managed by the at least one management device,
   polling the at least one management device by transmitting query requests at first prescribable time intervals from the at least one client device to the at least one management device, each query request querying as to whether the at least one printing device is available for executing the first order stored in the storage device of the at least one client device, and transmitting an enable signal, only in response to one of the query requests from the at least one client device, from the at least one management device to the at least one client device if the at least one printing device is available for executing the first order stored in the storage device of the at least one client device, and transmitting the stored first order from the at least one client device directly to the at least one printing device for execution of the first order after a receipt of the enable signal, and providing the at least one client device with a protection device or providing an intermediate device arranged between the at least one client device and the at least one management device with a protection device.

2. The method according to claim 1, wherein
a rank number is assigned to the received order request by the at least one management device,
wherein the sequence of the plurality of received orders is dependent on the rank numbers of the order request.

3. The method according to claim 2, wherein after receipt of the order request, at least the rank number assigned to the order request is transmitted in response from the at least one management device to the at least one client device.

4. The method according to claim 2, wherein
an order expense is determined by the at least one printing device for executing the first order from the at least one client device, and
the determined order expense is transmitted for a settlement from the at least one printing device to the at least one client device and/or to an accounting server.

5. The method according to claim 2 further comprising:
after receipt of the order request, transmitting the rank number assigned to the currently executed order request in response from the at least one management device to the at least one client.

6. The method according to claim 2 further comprising:
after receipt of the order request, transmitting said first time interval in response from the at least one management device to the at least one client.

7. The method according to claim 3, wherein
during execution of the first order, status requests are transmitted in second prescribable time intervals from the at least one client device to the at least one printing device, and
after receipt of each status request, a status response is transmitted from the at least one printing device to the at least one client device.

8. The method according to claim 3, wherein
an order expense is determined by the at least one printing device for executing the first order stored in the storage device of the at least one client device, and
the determined order expense is transmitted for a settlement from the at least one printing device to the at least one client device and/or to an accounting server.

9. The method according to claim 7, wherein after a receipt of a status response, a status message is transmitted from the at least one client device to the at least one management device.

10. The method according to claim 7, wherein
an order expense is determined by the at least one printing device for executing the first order stored in the storage device of the at least one client device, and
the determined order expense is transmitted for a settlement from the at least one printing device to the at least one client device and/or to an accounting server.

11. The method according to claim 9, wherein
an order expense is determined by the at least one printing device for executing the first order stored in the storage device of the at least one client device, and
the determined order expense is transmitted for a settlement from the at least one printing device to the at least one client device and/or to an accounting server.

12. The method according to claim 1, wherein
an order expense is determined by the at least one printing device for executing the first order stored in the storage device of the at least one client device, and
the determined order expense is transmitted for a settlement from the at least one printing device to the at least one client device and/or to an accounting server.

13. The method according to claim 1, wherein the protection device is a firewall configured to restrict access to the at least one client device from external devices.

14. The method according to claim 1, wherein the at least one management device behaves always passively.

15. A network system, comprising:
at least one client device,
at least one management device, and
at least one printing device,
wherein the at least one client device includes a protection device or an intermediate device arranged between the at least one client device and the at least one management device includes a protection device,
wherein the at least one client device is configured for providing a first order for execution by the at least one printing device,
wherein the at least one client device includes a storage device configured for storing the first order,
wherein the at least one client device is configured for transmitting an order request to the at least one management device, the order request only including data necessary for managing a sequence of a plurality of received orders by the at least one printing device, and
wherein the at least one management device is configured for managing the sequence of the plurality of received orders, wherein
the at least one client device is configured for polling the at least one management device by transmitting query requests in prescribable time intervals to the at least one management device, each query request querying as to whether the at least one printing device is available for executing the first order stored in the storage device of the at least one client device,
the at least one management device is configured for sending an enable signal only in response to one of the query requests from the at least one client device when the at least one printing device is available for executing the first order stored in the storage device of the at least one client device,
wherein after a receipt of the enable signal, the stored first order is transmitted from the at least one client device directly to the at least one printing device for execution of the first order.

16. A system comprising:
a computer program or product comprising a computer program with instructions executable on a processor such that an electronic communication network system is operated with at least one client device, at least one management device and at least one printing device, wherein the at least one client device includes a protection device or an intermediate device arranged between the at least one client device and the at least one management device includes a protection device, wherein, upon the execution of the computer program, the system is effective for performing operations including:

providing a first order from the at least one client device for execution by the at least one printing device, storing the first order in a storage device of the at least one client device, transmitting an order request from the at least one client device to the at least one management device, the order request only comprising data necessary for managing a sequence of a plurality of received orders by the at least one printing device, wherein the sequence of the plurality of received orders is managed by the at least one management device, polling the at least one management device by transmitting query requests at first prescribable time intervals from the at least one client device to the at least one management device, each query request querying as to whether the at least one printing device is available for executing the first order stored in the storage device of the at least one client device, and transmitting an enable signal, only in response to one of the query requests from the at least one client device, from the at least one management device to the at least one client device if the at least one printing device is available for executing the first order stored in the storage device of the at least one client device, and transmitting the stored first order from the at least one client device directly to the at least one printing device for execution of the first order after a receipt of the enable signal.

17. The computer program or product of claim 16 wherein said program or product comprises a computer program with instructions executable on a processor such that a rank number is assigned to the received order request by the at least one management device, wherein the sequence of the plurality of received orders is dependent on the rank numbers of the order request.

18. The computer program or product of claim 17 wherein said program or product comprises a computer program with instructions executable on a processor such that after receipt of the order request at least the rank number assigned to the order request is transmitted in response from the at least one management device to the at least one client device, preferably additionally the rank number assigned to the currently executed order request is transmitted, and especially preferably at least one first time interval is transmitted.

19. A method for operating a network system with at least one client device, at least one management device and at least one printing device, comprising:

providing a first order from the at least one client device for execution by the at least one printing device, storing the first order in a storage device of the at least one client device, transmitting an order request from the at least one client device to the at least one management device, the order request only comprising data necessary for managing a sequence of a plurality of received orders by the at least one printing device, wherein the sequence of the plurality of received orders is managed by the at least one management device, polling the at least one management device by transmitting query requests at first prescribable time intervals from the at least one client device to the at least one management device, each query request querying as to whether the at least one printing device is available for executing the first order stored in the storage device of the at least one client device, and transmitting an enable signal, only in response to one of the query requests from the at least one client device, from the at least one management device to the at least one client device if the at least one printing device is available for executing the first order stored in the storage device of the at least one client device, and transmitting the stored first order from the at least one client device directly to the at least one printing device for execution of the first order after a receipt of the enable signal, wherein a rank number is assigned to the received order request by the at least one management device, wherein the sequence of the plurality of received orders is dependent on the rank numbers of the order request, wherein after receipt of the order request, transmitting the rank number assigned to the currently executed order request in response from the at least one management device to the at least one client.

20. A method for operating a network system with at least one client device, at least one management device and at least one printing device, comprising:

providing a first order from the at least one client device for execution by the at least one printing device, storing the first order in a storage device of the at least one client device, transmitting an order request from the at least one client device to the at least one management device, the order request only comprising data necessary for managing a sequence of a plurality of received orders by the at least one printing device, wherein the sequence of the plurality of received orders is managed by the at least one management device, polling the at least one management device by transmitting query requests at first prescribable time intervals from the at least one client device to the at least one management device, each query request querying as to whether the at least one printing device is available for executing the first order stored in the storage device of the at least one client device, and transmitting an enable signal, only in response to one of the query requests from the at least one client device, from the at least one management device to the at least one client device if the at least one printing device is available for executing the first order stored in the storage device of the at least one client device, and transmitting the stored first order from the at least one client device directly to the at least one printing device for execution of the first order after a receipt of the enable signal, wherein a rank number is assigned to the received order request by the at least one management device, wherein the sequence of the plurality of received orders is dependent on the rank numbers of the order request, wherein after receipt of the order request, transmitting said first time interval in response from the at least one management device to the at least one client.

* * * * *